Feb. 11, 1958     M. L. SELKER ET AL     2,823,102
METHOD FOR PRODUCING SINGLE CRYSTALS OF SILICON
Filed Feb. 10, 1954
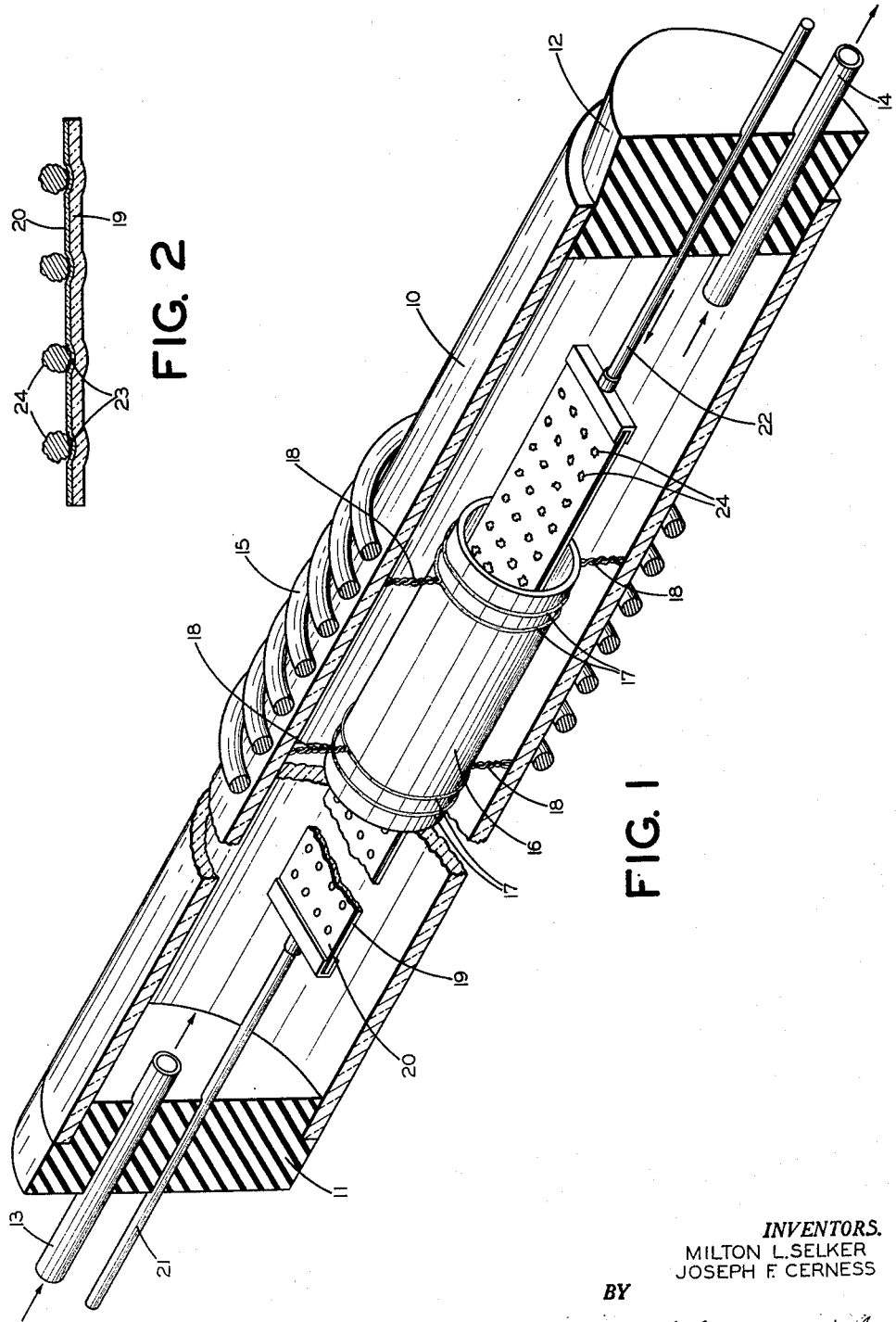
INVENTORS.
MILTON L. SELKER
JOSEPH F. CERNESS
BY William J. Flynn
ATTORNEY

United States Patent Office

2,823,102
Patented Feb. 11, 1958

2,823,102

METHOD FOR PRODUCING SINGLE CRYSTALS OF SILICON

Milton L. Selker, Shaker Heights, and Joseph F. Cerness, East Cleveland, Ohio, assignors to Clevite Corporation, Cleveland, Ohio, a corporation of Ohio Application February 10, 1954, Serial No. 409,382

5 Claims. (Cl. 23—300)

This invention relates to the production of silicon. While the advantages of silicon for various purposes are well recognized, serious practical difficulties have been encountered in processing silicon into the desired articles. Two of the most important of these are the difficulty of melting silicon in a container which will not react with the silicon to contaminate it and the difficulty of obtaining single crystals of silicon by the conventional crystal pulling method, which involves dipping a properly oriented single crystal seed of silicon into a melt of silicon and then withdrawing the seed slowly from the melt to initiate single crystal growth therein.

It is an object of the present invention to provide a novel and improved method of producing single crystal silicon.

It is also an object of this invention to provide a novel method of producing silicon which avoids contamination of the silicon by its support while the molten condition.

Another object of this invention is to provide a novel method of producing single crystal silicon which requires no "seeding" of the silicon to initiate single crystal growth therein.

A further object of this invention is to provide a novel method of producing small single crystal pellets of silicon.

A still further object of this invention is to provide a novel method of producing small sized single crystals of silicon which reduces the expense and the number of steps required for producing such crystals.

In accordance with present invention the foregoing objectives preferably are accomplished by a process in which the silicon, while supported in contact with boron nitride powder in a non-reactive atmosphere, is heated to molten condition and then cooled to initiate spontaneous single crystal nucleation in the silicon.

In the following description and the accompanying drawing there is disclosed a specific preferred embodiment of the process of the present invention, and one form of apparatus for its practice, by which the purposes of this invention may be carried out in order to achieve the advantageous results specified above, without, however, intending that this invention be construed as being limited to this specific embodiment.

In the drawing:

Fig. 1 is an isometric view, with parts broken away for clarity, showing a furnace arrangement for producing single crystal silicon pellets in accordance with the present process; and Fig. 2 is an enlarged section showing the manner in which the silicon specimens are supported in the Fig. 1 furnace.

Referring to Fig. 1, there is provided a furnace for melting specimens of silicon which includes an elongated quartz tube 10. In one practical embodiment this tube may be about 2 inches in diameter. One end of the quartz tube 10 is closed in gas-tight fashion by a suitable flanged end cap 11 of rubber or other suitable material. The opposite end of tube 10 is closed by a tapered frustoconical rubber plug 12, which may be removed and inserted manually. The end cap 11 receives a conduit 13 for passing a suitable non-reactive gas, such as argon or helium, into the interior of the quartz tube 10. A gas outlet conduit 14 extends through the other end cap 12.

An induction heating coil 15, which may be connected to any suitable energization source (not shown) extends closely around the quartz tube 10 for a distance of about 2 inches midway along the tube. Within the quartz tube 10 there is positioned a high frequency susceptor in the form of a tubular cylinder 16 which preferably extends coaxial with the quartz tube 10 and which in the case of a 2 inch diameter quartz tube may have a diameter of about 1 inch. The cylinder 16 preferably is of tantalum, molybdenum, tungsten, or pure graphite. Alternatively, it might also be of iridium, osmium, ruthenium or rhenium, although these materials are more expensive than the materials first mentioned.

A plurality of tungsten wires 17 are wrapped around the cylinder 16 and then twisted together at their ends to provide legs 18 which at their outer ends have substantially point contacts with the inner surface of the quartz tube 10. Tungsten wires would be used for this purpose of the cylinder 16 is made of any of the metals named above. Alternatively, if the cylinder 16 is of graphite then it could be provided with integral thin graphite legs in place of the tungsten wires. In such event, however, these graphite legs should not contact the quartz tube directly, so that small pieces of alumina ($Al_2O_3$) or beryllia (BeO) should be interposed between these graphite legs and the quartz tube. With either of these arrangements, the susceptor contacts the quartz tube through small cross-section supports of a very refractory nature, thereby avoiding destruction of the quartz by excessive heat, or through reaction of hot quartz with the vapors present in the tube or with the susceptor material. These small cross-section supports serve to locate and support the cylinder properly within the quartz tube 10. With this arrangement, the cylinder 16 is positioned to be induction heated by coil 15 and to provide a melting zone about 2 inches long within the quartz tube.

The refractory support for the silicon to be melted and subsequently cooled is shown in Fig. 1 in the form of a slab or boat 19 of alumina ($Al_2O_3$), beryllia (BeO), or zirconia ($ZrO_2$), provided with a layer or lining 20 of boron nitride of the highest purity obtainable. The boron nitride is in the form of powder pressed onto the top of the slab 19. The refractory slab 19 at its opposite ends is connected to stainless steel rods 21 and 22, respectively, which extend through the end caps 11 and 12 in substantially gas-tight relation. The stainless steel rods 21 and 22 are connected to a suitable source of motive power (not shown) which imparts to them a longitudinal motion to the left in Fig. 1. With this arrangement, the refractory support 19, 20 moves lengthwise through the susceptor 16 at a suitable constant linear speed.

As shown in Fig. 2, the refractory slab may desirably be formed with slight recesses or depressions 23 in its upper face for receiving and locating the small specimens 24 of silicon. These specimens preferably each have a mass substantially equal to the desired mass of the crystal for the semiconductor device, such as a diode or transistor, for which it is intended. In one practical embodiment, the specimen mass may be equivalent to that of a sphere which is .050 inch in diameter. This particular size is not a critical factor since the specimen may be smaller or larger without significantly changing the results, and this size is mentioned merely as illustrative of one arrangement with which successful results have been obtained in practice. These silicon specimens may be prepared by reacting silicon tetrachloride ($SiCl_4$)

with zinc vapor in a quartz container, which produces silicon crystals (polycrystalline) having one part per million or less zinc. These crystals would then be powdered and pressed into suitable practice size and thereafter sintered to provide the somewhat irregularly shaped small specimens shown in Fig. 2.

With these specimens of silicon supported on the refractory slab 19, 20, the slab is caused to move at a constant linear speed through the heating zone provided by the susceptor cylinder 16. If the susceptor is of any of the metals named above the non-reactive atmosphere in tube 10 may be provided by purified argon or helium, which is passed through the tube in a continuous stream from the inlet conduit 13 to the outlet conduit 14. If the cylinder 16 is of graphite, then hydrogen, argon, or helium may be used to provide a non-reactive atmosphere in tube 10. Preferably the susceptor cylinder 16 should be heated to a temperature about 200° C. above the melting point for silicon, which is 1426° C., in order to insure that the silicon will be melted in this heating zone by radiation from the susceptor 16. After having been melted in this heating zone, as the silicon specimens emerge from the cylinder 16 they cool gradually into spheres of substantially pure single crystal silicon.

If desired, the silicon specimens can be "doped" with suitable impurities to give them desired characteristics by mixing the donor or acceptor metal with the silicon powder before pressing the powder into suitable specimen size. Alternatively, the donor or acceptor metals may be added to the specimens by exposing the molten specimens to the vapors of such metals while in the melting zone of the furnace.

It has been found that the specific nature of the refractory material which contacts the silicon specimens during the melting and cooling steps is quite critical. In fact, it has been found that boron nitride is the only refractory material suitable for contacting silicon during this operation in order to produce single crystal pellets. Thus, based on our attempts to produce single crystal silicon in accordance with the foregoing process using various refractories, the behavior of molten silicon in a non-reactive atmosphere in contact with various refractory materials can be grouped into four classes:

(1) Refractories which react with the silicon, causing disappearance of the silicon or its appearance in a compound or alloy: carbon as graphite or carbon black, cerium dioxide ($CeO_2$), titanium carbide (TiC), baron carbide ($B_4C$), tantalum carbide (TaC), titanium nitride (TiN), zirconium dinitride ($ZrN_2$), zirconium boride (ZrB), titanium boride (TiB), molybdenum disulphide ($MoS_2$), 90% barium sulphide (BaS), platinum, tungsten, and titanium;

(2) Refractories which are wet by molten silicon and to which the silicon adheres strongly when solidified. If particles of the refractory are present they envelop the silicon pellets. Such refractories include: alumina ($Al_2O_3$), zirconia ($ZrO_2$), magnesia (MgO), thoria ($ThO_2$), silica ($SiO_2$), silicon carbide (SiC), carbon as diamond, beryllium nitride ($Be_3N_2$), silicon nitride (SiN), porcelain, zircon, mullite, and tantalum;

(3) The refractory is wet by the molten silicon but if there are particles or fragments of the refractory present the silicon specimen does not become enveloped therein. This applies to beryllia (BeO); and (4) The refractory is not wet by the molten silicon and the silicon specimen upon cooling is a single crystal. This is true only of boron nitride among the refractories tested.

It has been found that the rate at which the molten globules of silicon are cooled is not particularly critical insofar as the production of small sized single crystal pellets of the order of magnitude of .050 inch in diameter is concerned, so that the rate at which the refractory support is withdrawn from the furnace zone provided by cylinder 16 in Fig. 1 may be varied within rather wide limits with successful results.

Following the formation of single crystal pellets of silicon, as described, the refractory slab 19, 20 may be removed from the quartz tube 10, after first removing the end plug 12.

From the foregoing, it will be understood that by the present process it is possible to produce single crystal silicon pellets. The preparation of such single crystal pellets in accordance with the present invention requires no "seeding" since single crystal nucleation occurs spontaneously upon melting and cooling, nor does it require mechanical shaping of the silicon down to the appropriate size after it has been rendered single crystalline.

It is to be understood that the principles of the present invention may be applied also to the preparation of larger masses of silicon, such as ingots or slabs from which smaller pieces may be fabricated. It will be recognized, however, that such larger masses of silicon tend more to be polycrystalline, because of the increased mass required to cool, than is the case with small sized specimens. Accordingly, the cooling rate of such larger specimens would have to be closely controlled in order to promote single crystal growth. However, even if these larger specimens turn out polycrystalline, they still may be used for various applications since they have the advantage of being substantially uncontaminated by the material of the support upon which they were melted and cooled.

While in the foregoing description and the accompanying drawing there has been disclosed a specific preferred embodiment of the present invention, it is to be understood that various modifications, omissions and refinements which depart from the specific disclosed embodiment may be adopted without departing from the spirit and scope of this invention.

We claim:

1. A method of producing single crystal silicon which comprises the steps of heating to molten condition and thereafter cooling silicon in a non-reactive atmosphere, and during said heating and cooling steps supporting the silicon on substantially pure boron nitride powder for nucleation of a single crystal in response to the heating and cooling steps.

2. A method of producing crystalline silicon which comprises the steps of supporting a mass of silicon on substantially pure boron nitride powder, positioning the silicon mass supported on the boron nitride powder in a non-reactive atmosphere in the melting zone of a furnace and establishing an elevated temperature in the melting zone of the furnace to melt the silicon, and subsequently cooling the silicon in a non-reactive atmosphere.

3. A method of producing single crystal silicon which comprises supporting silicon on pure boron nitride powder in a non-reactive atmosphere while melting the silicon and subsequently permitting it to solidify.

4. A method of producing single crystal silicon which comprises supporting silicon on a supporting member coated with substantially pure boron nitride powder while melting and subsequently permitting the silicon to solidify in a non-reactive atmosphere.

5. A method of producing single crystal silicon which comprises disposing silicon on a layer of boron nitride powder coated on a supporting member and, while thus disposed, melting and subsequently permitting the silicon to solidify in a non-reactive atmosphere.

References Cited in the file of this patent

UNITED STATES PATENTS

| | | |
|---|---|---|
| 1,180,968 | Brockbank | Apr. 25, 1916 |
| 2,214,976 | Stockborger | Sept. 17, 1940 |
| 2,402,582 | Scaff | June 25, 1946 |

(Other references on following page)

UNITED STATES PATENTS

| | | |
|---|---|---|
| 2,469,418 | Striplin | May 10, 1949 |
| 2,475,810 | Theuerer | July 12, 1949 |
| 2,537,257 | Brattain | Jan. 9, 1951 |
| 2,674,520 | Sobek | Apr. 6, 1954 |
| 2,679,080 | Olsen | May 25, 1954 |

FOREIGN PATENTS

| | | |
|---|---|---|
| 21,378 | Great Britain | 1914 |
| 590,458 | Great Britain | July 18, 1947 |

OTHER REFERENCES

Pfann: "Principles of Zone Melting," in "Journal of Metals," July 1952, pages 747 to 753 inclusive.

Finlay et al.: Article in "American, Ceramic Society Bulletin," vol. 31, No. 4, 1952, pages 141 to 143 inclusive.

Androde et al.: Article in "Proc. Phys. Soc.," 1937, pages 152–158 inclusive.

Schumacher: Article in "Journal of Metals," November 1953, pages 1428 and 1429.